(12) United States Patent
Yang et al.

(10) Patent No.: US 11,715,923 B2
(45) Date of Patent: Aug. 1, 2023

(54) METAL FOIL FLARING APPARATUS

(71) Applicants: Tyco Electronics (Shanghai) Co. Ltd., Shanghai (CN); TE Connectivity Corporation, Berwyn, PA (US)

(72) Inventors: An Yang, Shanghai (CN); Lvhai Hu, Shanghai (CN); Yun Liu, Shanghai (CN); Sun Kyu Pak, Middletown, PA (US)

(73) Assignees: TE Connectivity Solutions GmbH, Schaffhausen (CH); Tyco Electronics (Shanghai) Co., Ltd., Shanghai (CN)

( * ) Notice: Subject to any disclaimer, the term of this patent is extended or adjusted under 35 U.S.C. 154(b) by 611 days.

(21) Appl. No.: 16/808,937

(22) Filed: Mar. 4, 2020

(65) Prior Publication Data

US 2020/0287342 A1   Sep. 10, 2020

(30) Foreign Application Priority Data

Mar. 4, 2019  (CN) .......................... 201910160278.8

(51) Int. Cl.
| | |
|---|---|
| *H01R 43/28* | (2006.01) |
| *B21D 41/02* | (2006.01) |
| *H01B 13/016* | (2006.01) |
| *H02G 1/12* | (2006.01) |
| *H01B 13/22* | (2006.01) |
| *H01R 9/05* | (2006.01) |

(52) U.S. Cl.
CPC ............. *H01R 43/28* (2013.01); *B21D 41/02* (2013.01); *B21D 41/028* (2013.01); *H01B 13/0162* (2013.01); *H01B 13/227* (2013.01); *H02G 1/12* (2013.01); *H01R 9/0509* (2013.01)

(58) Field of Classification Search
CPC ...... H01R 43/28; B21D 41/02; B21D 41/028; H01B 13/0162; H01B 13/227; H02G 1/12
See application file for complete search history.

(56) References Cited

U.S. PATENT DOCUMENTS

| | | | | |
|---|---|---|---|---|
| 4,719,697 A | * | 1/1988 | Schwartzman | ........ H01R 43/05 |
| | | | | 81/9.51 |
| 6,243,947 B1 | * | 6/2001 | Fujita | .................. H02G 1/1256 |
| | | | | 29/33 F |
| 6,363,604 B1 | * | 4/2002 | Sakuma | ............... H02G 1/1256 |
| | | | | 81/9.51 |

(Continued)

FOREIGN PATENT DOCUMENTS

| | | | | |
|---|---|---|---|---|
| CN | 107017060 A | * | 8/2017 | ......... H01B 13/0207 |
| EP | 1237237 A2 | * | 9/2002 | ............. H01R 43/05 |

(Continued)

*Primary Examiner* — Jeffrey T Carley
(74) *Attorney, Agent, or Firm* — Barley Snyder

(57) ABSTRACT

A metal foil flaring apparatus includes a frame, a flaring mechanism mounted on the frame and having a flaring mouth adapted to open and close, and a first driver mounted on the frame and adapted to drive the flaring mouth to open and close. The flaring mouth has a cone shape gradually contracted toward a front end of the flaring mouth. The front end of the flaring mouth is adapted to be forwardly inserted in a first direction between an inner insulation layer of a cable and a metal foil wrapped around the inner insulation layer when the flaring mouth is closed, flaring the metal foil outwardly into the cone shape.

19 Claims, 13 Drawing Sheets

(56) References Cited

U.S. PATENT DOCUMENTS

| | | | | |
|---|---|---|---|---|
| 7,395,592 | B2 * | 7/2008 | Matsumura | H01R 43/28 29/33 F |
| 8,424,196 | B2 * | 4/2013 | Mori | H02G 1/14 29/745 |
| 9,246,245 | B2 * | 1/2016 | Kawase | H01R 9/0518 |
| 2020/0076148 | A1 * | 3/2020 | Houser | H02G 1/1265 |
| 2021/0194225 | A1 * | 6/2021 | Deng | H01R 43/28 |
| 2022/0102029 | A1 * | 3/2022 | Wang | H01B 13/016 |

FOREIGN PATENT DOCUMENTS

| | | | | |
|---|---|---|---|---|
| EP | 2117089 | A1 * | 11/2009 | H01R 43/28 |
| EP | 3193411 | A1 * | 7/2017 | |
| EP | 3270478 | A1 * | 1/2018 | H01R 43/05 |

* cited by examiner

METAL FOIL FLARING APPARATUS

CROSS-REFERENCE TO RELATED APPLICATION

This application claims the benefit of the filing date under 35 U.S.C. § 119(a)-(d) of Chinese Patent Application No. 201910160278.8, filed on Mar. 4, 2019.

FIELD OF THE INVENTION

The present invention relates to a flaring apparatus and, more particularly, to a flaring apparatus flaring a metal foil of a cable.

BACKGROUND

In many applications, a cable is connected to a conductive terminal of a connector. Before the connection, an outer sheath layer and an electromagnetic shielding layer at an end of the cable must be stripped off. A layer of metal foil, such as a layer of aluminum foil, is then wrapped around an exposed inner insulation layer of the cable so as to restore an electromagnetic shielding performance of a joint of the cable.

In order to allow the conductive terminal of the connector to be easily connected to a conductor of the cable without damaging the metal foil, it is necessary to flare the metal foil into a cone shape, which may prevent the conductive terminal of the connector from contacting and damaging the metal foil. The metal foil, however, is generally flared into the cone shape manually. Manual flaring of the metal foil has low efficiency and poor quality. Further, the metal foil is apt to be damaged in the manual flaring process, thereby resulting in product waste.

SUMMARY

A metal foil flaring apparatus includes a frame, a flaring mechanism mounted on the frame and having a flaring mouth adapted to open and close, and a first driver mounted on the frame and adapted to drive the flaring mouth to open and close. The flaring mouth has a cone shape gradually contracted toward a front end of the flaring mouth. The front end of the flaring mouth is adapted to be forwardly inserted in a first direction between an inner insulation layer of a cable and a metal foil wrapped around the inner insulation layer when the flaring mouth is closed, flaring the metal foil outwardly into the cone shape.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
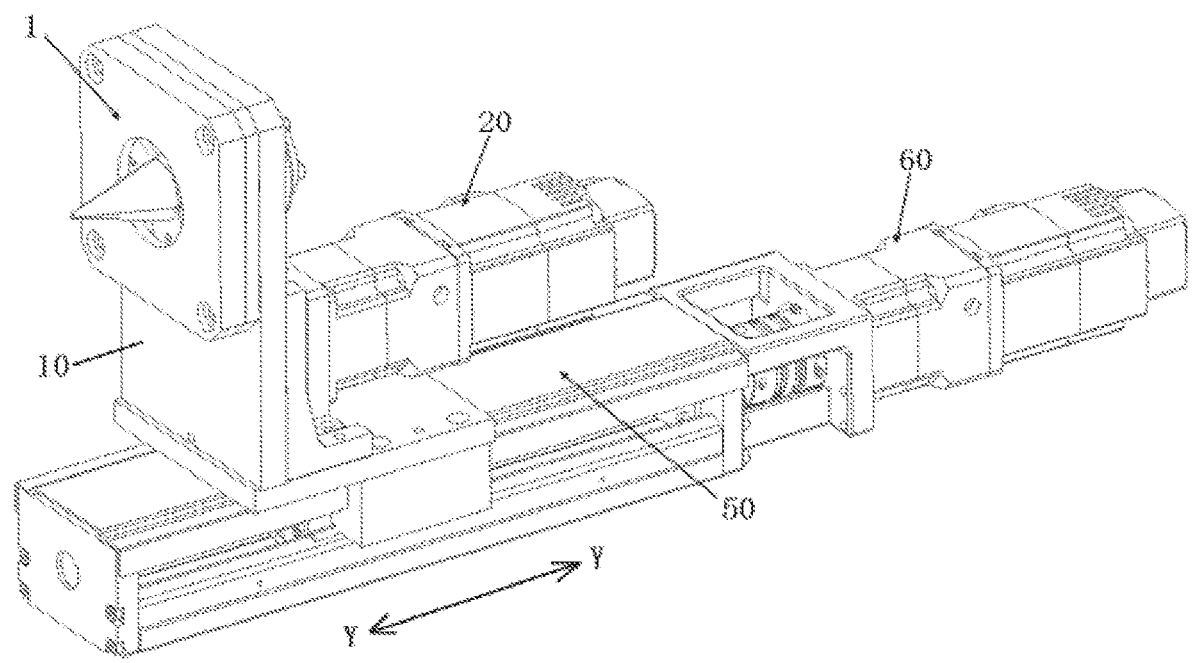
FIG. 1 is a perspective view of a metal foil flaring apparatus according to an embodiment.
Figure 2:
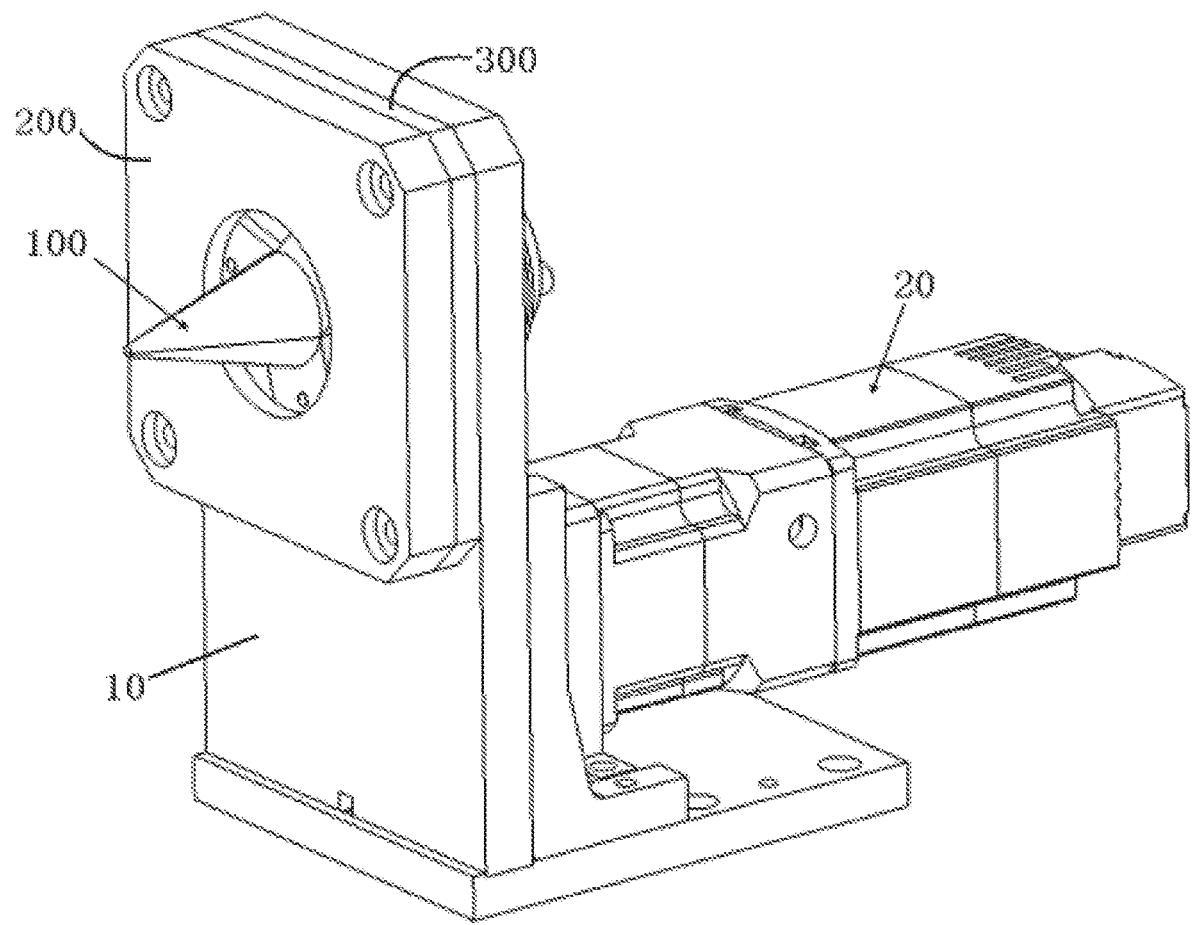
FIG. 2 is a front perspective view of a flaring mechanism and a first driver of the flaring apparatus.

The technical solution of the disclosure will be described hereinafter in further detail with reference to the following embodiments, taken in conjunction with the accompanying drawings. In the description, the same or similar reference numerals indicate the same or similar parts. The description of the embodiments of the disclosure hereinafter with reference to the accompanying drawings is intended to explain the general inventive concept of the disclosure and should not be construed as a limitation on the disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

As shown in FIGS. 1, 2, and 10-12, a metal foil flaring apparatus comprises a frame 10, a flaring mechanism 1 mounted on the frame 10 and having a flaring mouth 100 adapted to be driven to open and close, and a first driver 20, 30, 40 mounted on the frame 10 and adapted to drive the flaring mouth 100 to open and close.

In a closed position, the flaring mouth 100 has a cone shape gradually contracted towards its front end. The front end of the flaring mouth 100 is adapted to be forwardly inserted between an inner insulation layer 2a and a metal foil 3 of a cable 2 wrapped around the inner insulation layer 2a of the cable 2 in a first direction Y so as to flare the metal foil 3 outwardly into the cone shape.

As shown in FIGS. 1, 2, and 10-12, the metal foil flaring apparatus further comprises a slide rail 50 and a second driver 60. The slide rail 50 extends linearly in the first direction Y, and the frame 10 is slidably mounted on the slide rail 50. The second driver 60 is adapted to drive the frame 10 and the flaring mechanism 1 mounted on the frame 10 to move linearly in the first direction Y. The slide rail 50 is mounted on a fixed base (not shown), and the second driver 60 may comprise a motor and a transmission mounted on the fixed base.

As shown in FIGS. 1, 2, and 10-12, the flaring mechanism 1 is driven by the second driver 60 to move linearly forward so as to insert the front end of the flaring mouth 100 between the inner insulation layer 2a of the cable 2 and the metal foil 3 when the flaring mouth 100 is closed and the front end of the flaring mouth 100 is clamped onto the inner insulation layer 2a of the cable 2.

The flaring mouth 100 is rotatable about an axis parallel to the first direction Y, shown in FIG. 1, after the flaring mouth 100 is closed. The first driver 20, 30, 40 is further adapted to drive the flaring mouth 100 to rotate about the axis after the flaring mouth 100 is closed.

As shown in FIGS. 4, 5, and 10-12, the flaring mouth 100 is adapted to define a center retaining hole 101 extending linearly in the first direction Y after the flaring mouth 100 is closed. The inner insulation layer 2a of the cable 2 is adapted to be retained in the center retaining hole 101 of the flaring mouth 100. When the inner insulation layer 2a of the cable 2 is retained in the center retaining hole 101 of the flaring mouth 100, the slightly bent cable 2 may be straightened by rotating the flaring mouth 100.

As shown in FIGS. 6-9, the flaring mechanism 1 includes a rotary spindle 600 rotatably mounted on the frame 10 to be rotatable about an axis, a fixed plate 300 fixed on the frame 10 and formed with three guide grooves 310, three transmission mechanisms 500, each of which has a first end pivotally connected onto the rotary spindle 600 and a second end provided with a first sliding bar 510, and a rotation plate 400 rotatably mounted on the fixed plate 300 to be rotatable about the axis and having three radial sliding grooves 410 perpendicular to the axis.

The flaring mouth 100, as shown in FIGS. 6-9, has three flaring mouth members 110 comprising a connection plate 120 perpendicular to the axis, a pair of second sliding bars 130, and an insertion hole 140 located between the two second sliding bars 130. The first sliding bar 510 on each of the transmission mechanisms 500 is inserted into one of the guide grooves 310, one of the radial sliding grooves 410, and one of the insertion holes 140. The two second sliding bars 130 on each of the flaring mouth members 110 are inserted into one of the radial sliding grooves 410. Each of the guide grooves 310 has an arc-shaped guide groove 311 centered on the axis of the rotary spindle 600 and a radial guide groove 312 communicated with the arc-shaped guide groove 311 and extending perpendicular to the axis of the rotary spindle 600.

Figure 3:
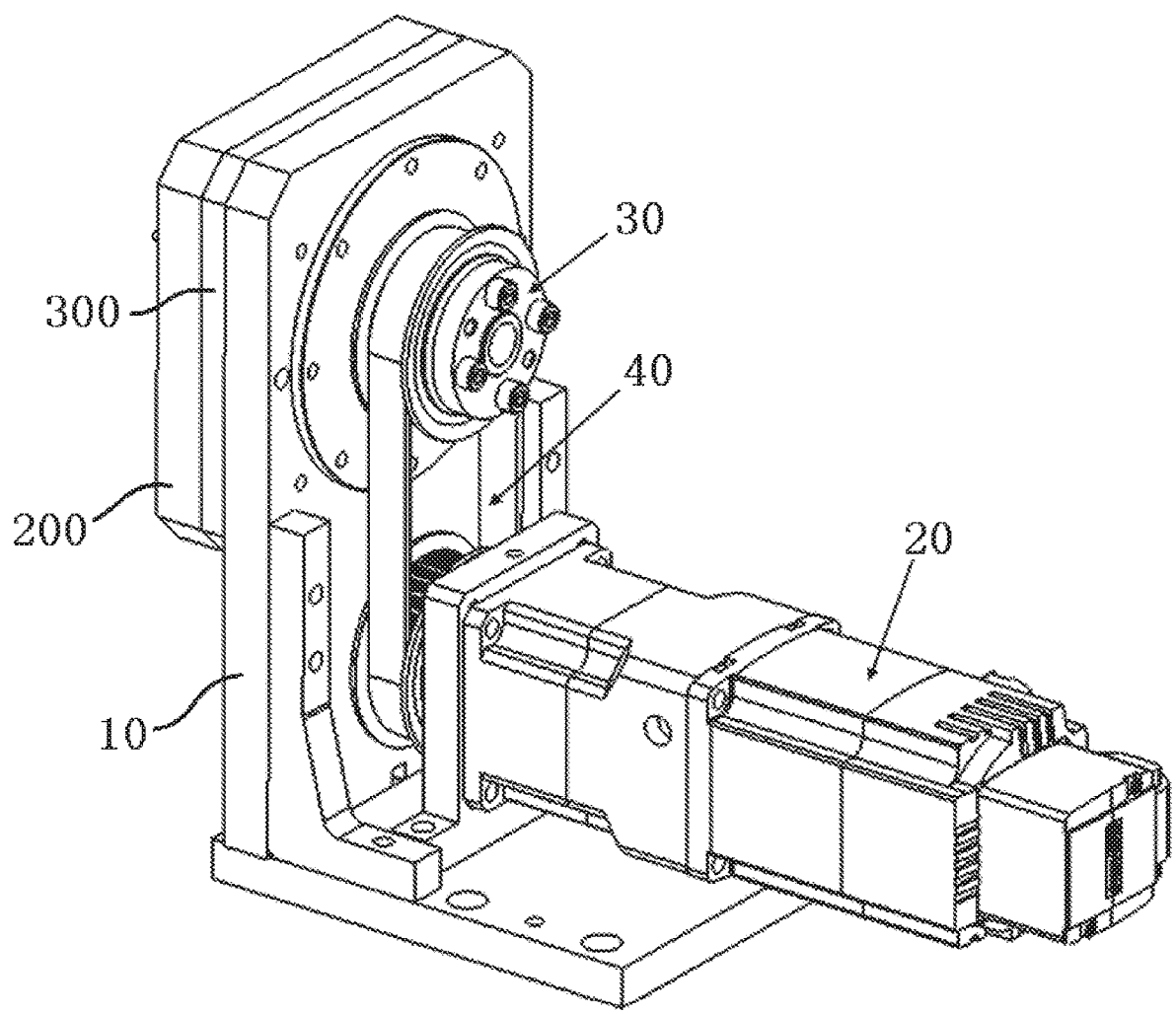
FIG. 3 is a rear perspective view of the first driver and the flaring mechanism.

The first driver 20, 30, 40 is adapted to drive the rotary spindle 600 to rotate about the axis. The rotary spindle 600 is adapted to drive the first sliding bars 510 of the transmission mechanisms 500 to slide in the respective guide grooves 310 and the respective radial slide grooves 410. The first driver 20, 30, 40, as shown in FIG. 3, includes a motor 20 mounted on the frame 10, a pulley 30 connected with the rotary spindle 600, and a drive belt 40 connected between an output shaft of the motor 20 and the pulley 30. The pulley 30 is driven by the motor 20 to rotate through the drive belt 40 to drive the rotary spindle 600 to rotate.

Figure 7:
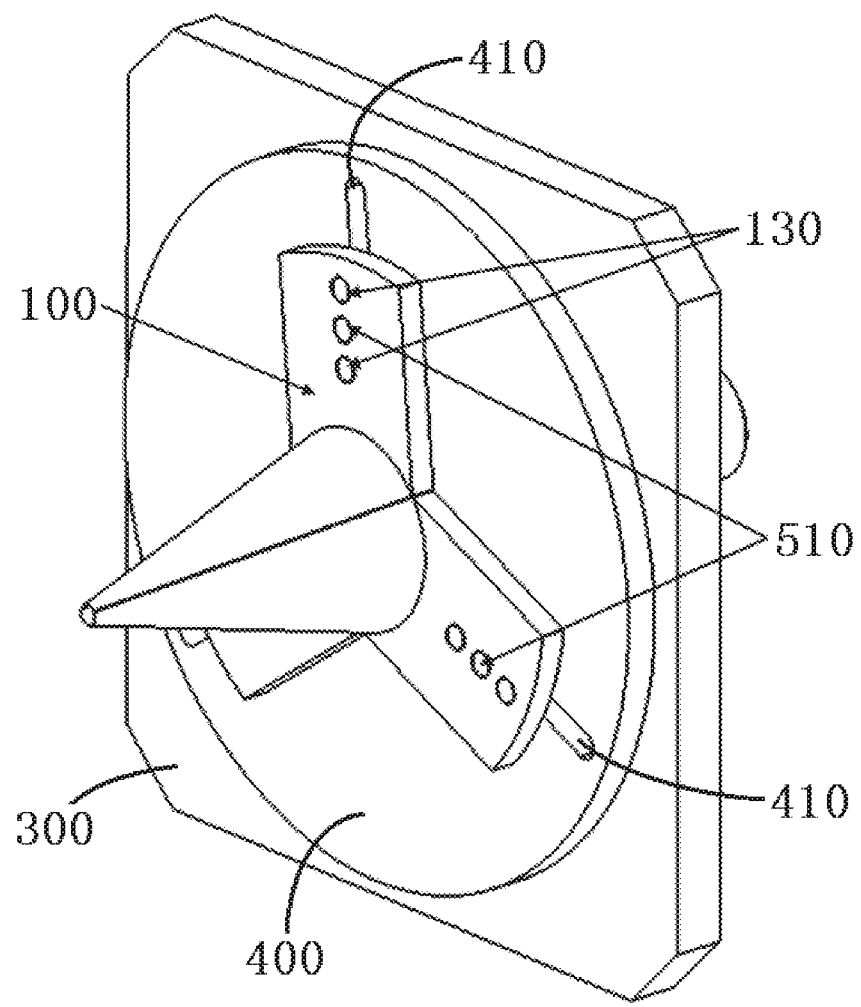
FIG. 7 is a perspective view of the flaring mechanism with a housing removed.
Figure 8:
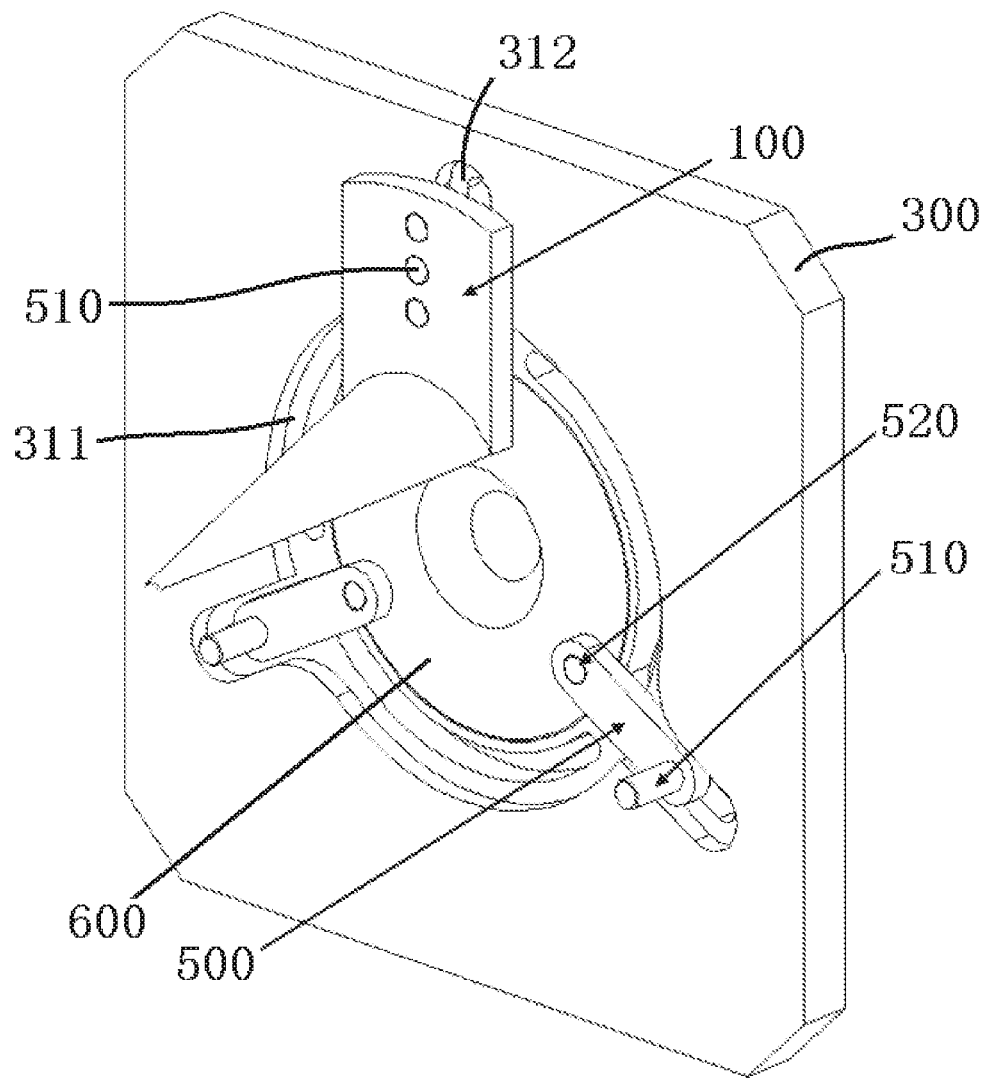
FIG. 8 is a perspective view of the flaring mechanism with a rotation plate removed and the flaring mouth in the open position.
Figure 9:
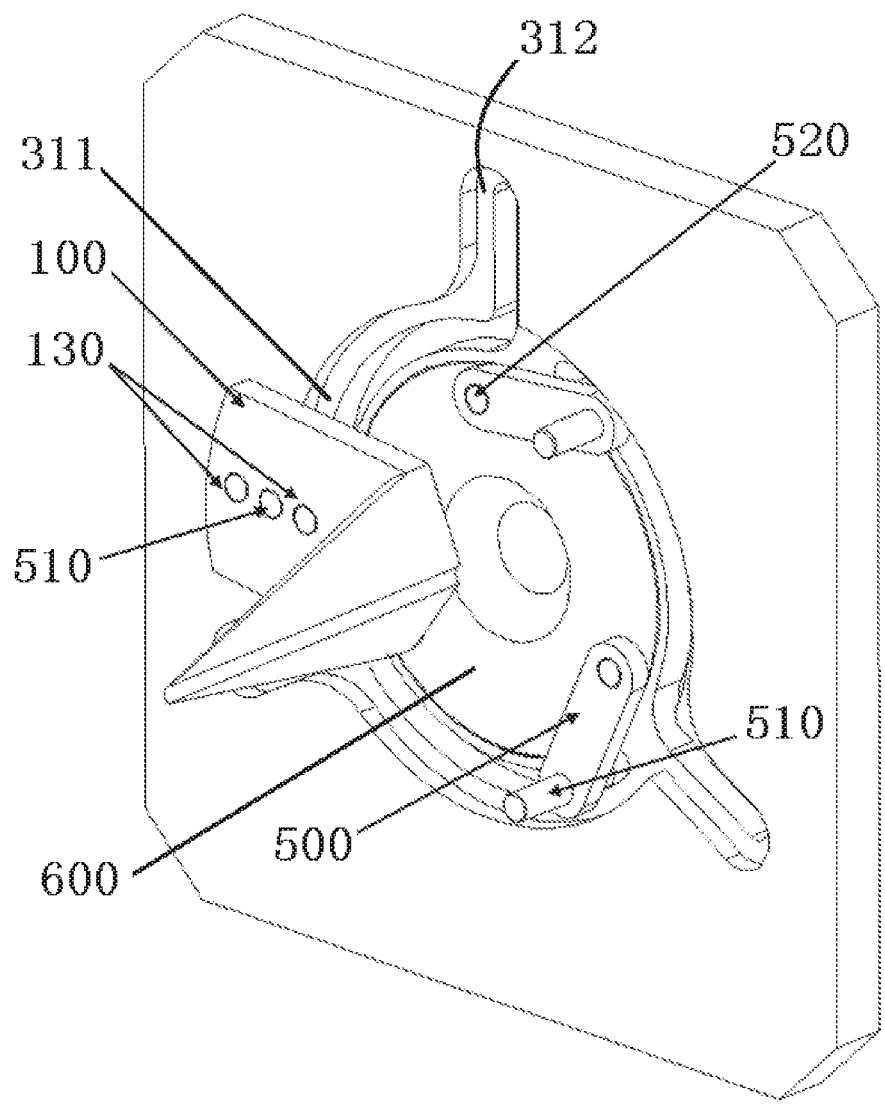
FIG. 9 is a perspective view of the flaring mechanism with the rotation plate removed and the flaring mouth in the closed position.

As shown in FIGS. 7-9, the three flaring mouth members 110 may be driven to open or close when the first sliding bars 510 on the transmission mechanisms 500 slide in the radial guide grooves 312 of the guide grooves 310. The three flaring mouth members 110 and the rotation plate 400 may be driven to rotate about the axis when the first sliding bars 510 of the transmission mechanism 500 slide in the arc-shaped guide grooves 311 of the guide grooves 310.

Figure 4:
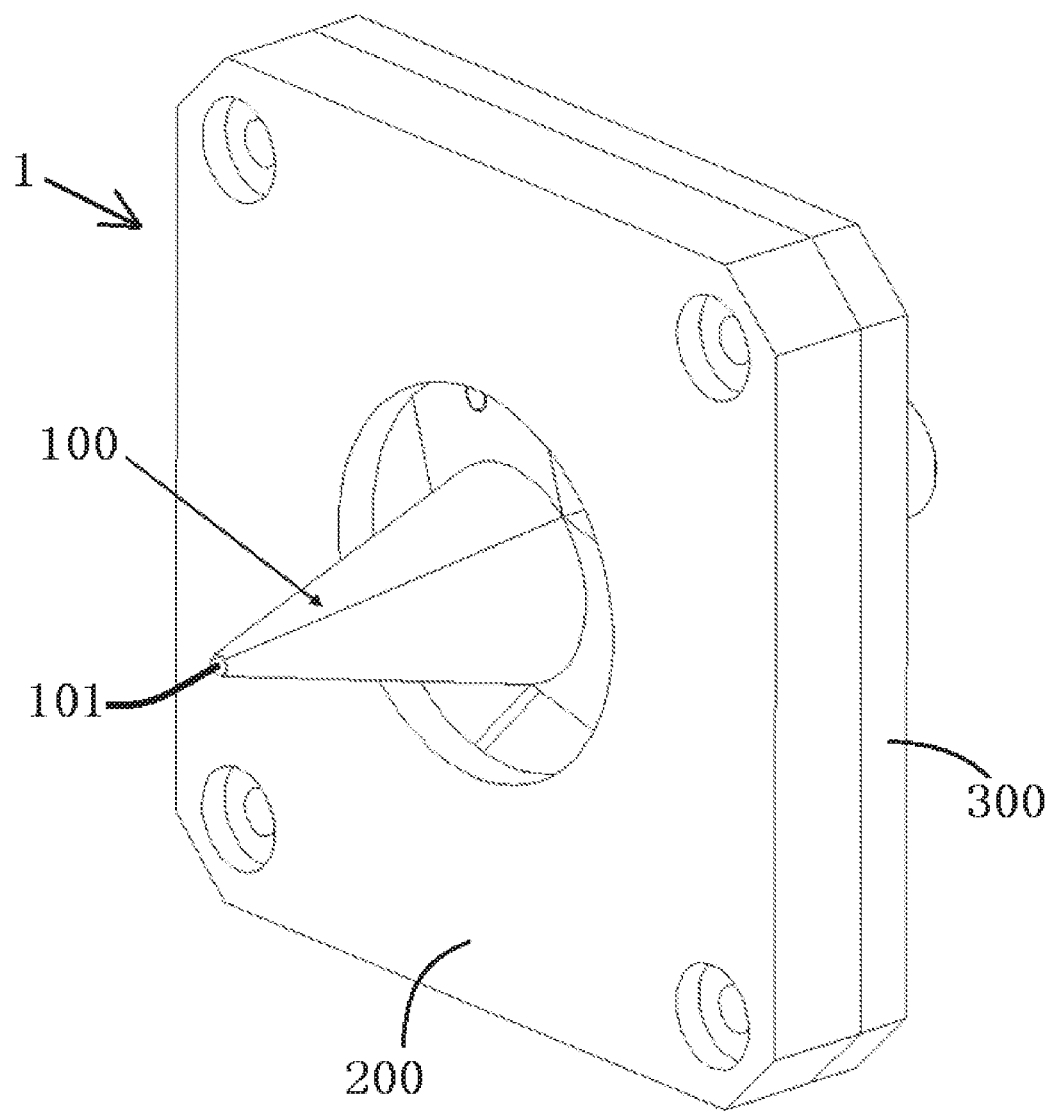
FIG. 4 is a perspective view of the flaring mechanism with a flaring mouth in a closed position.
Figure 5:
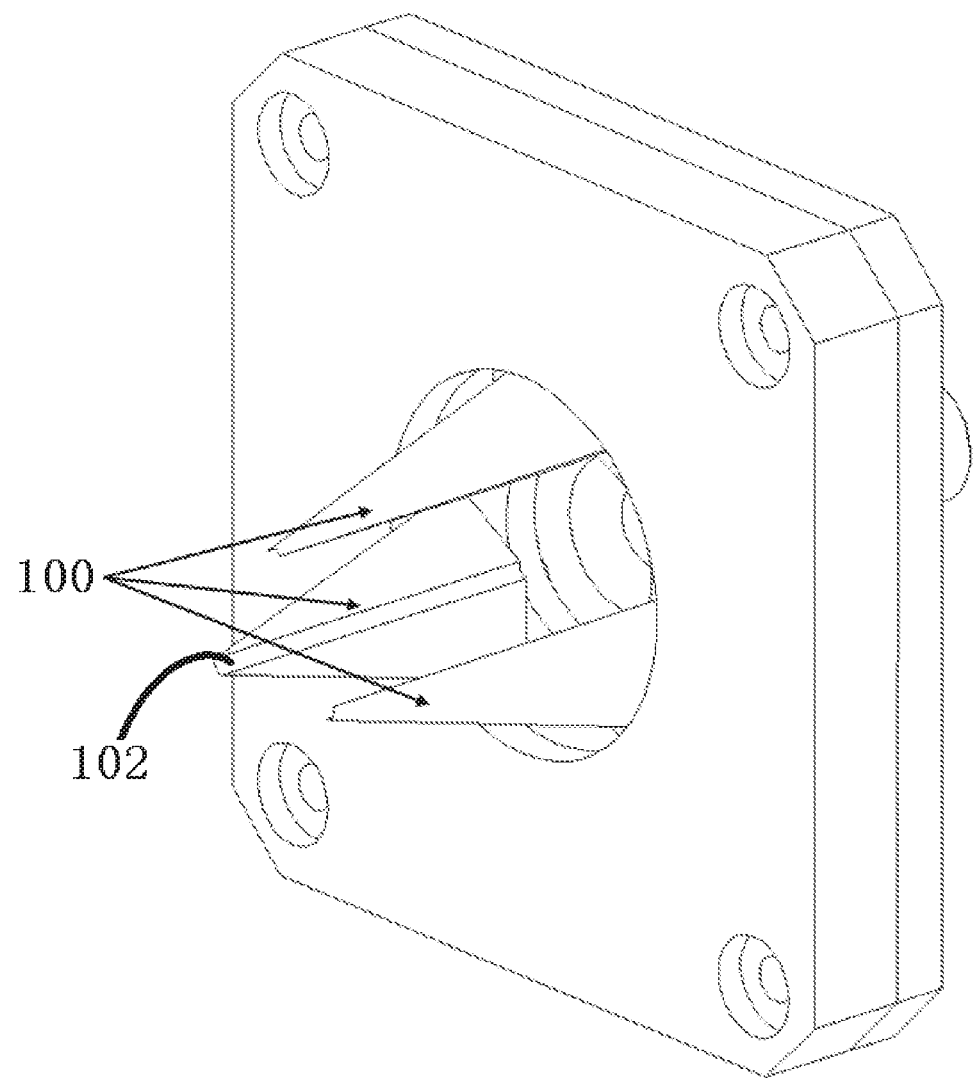
FIG. 5 is a perspective view of the flaring mechanism with the flaring mouth in an open position.

As shown in FIGS. 4 and 5, each of the flaring mouth members 110 is formed with an arc-shaped retaining groove 102 extending linearly in the first direction Y. The arc-shaped retaining grooves 102 in the three flaring mouth members 110 are arranged to define the center retaining hole 101 when the three flaring mouth members 110 are closed.

Figure 6:
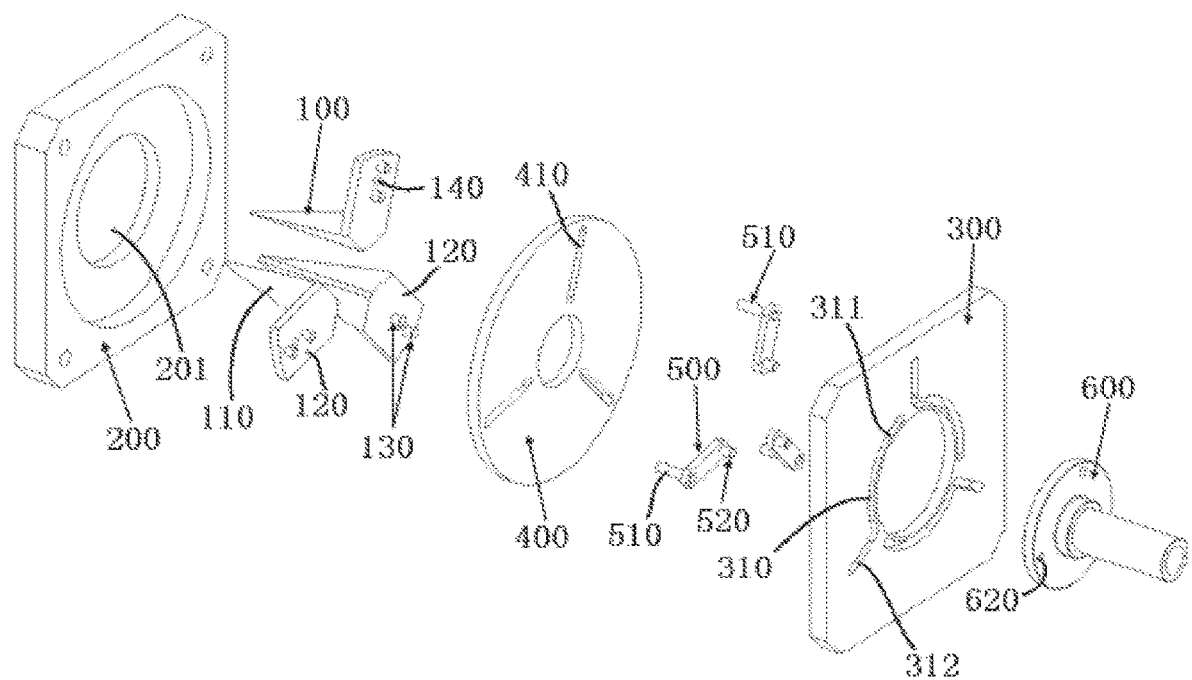
FIG. 6 is an exploded perspective view of the flaring mechanism.

As shown in FIGS. 6, 8, and 9, each of the transmission mechanisms 500 has a main body perpendicular to the axis, a pin 520 provided at a first end of the main body, and the first sliding bar 510 provided at a second end of the main body. The rotary spindle 600 has a flange formed with a connection hole 620 matched with the pin 520. The pin 520 is adapted to be inserted into the connection hole 620 and freely rotatable in the connection hole 620.

The flaring mechanism 1, as shown in FIGS. 2-6, includes a housing 200 mounted onto the fixed plate 300. The rotation plate 400 and the connection plate 120 of the flaring mouth 100 are accommodated in the housing 200. The housing 200 is formed with a circular opening 201, through which the flaring mouth member 110 of the flaring mouth 100 protrudes from the housing 200.

Figure 13:
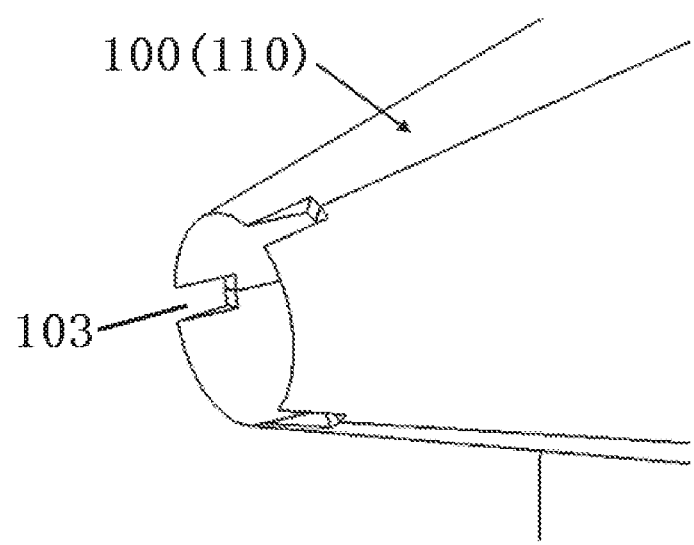
FIG. 13 is a perspective view of a front end of the flaring mouth.

As shown in FIG. 13, in an embodiment, the flaring mouth 100 has a plurality of notches 103 at the front end to facilitate an insertion of the front end of the flaring mouth 100 between the inner insulation layer 2a and the metal foil 3 of the cable 2. The front end of the flaring mouth 100 is formed as a wedged-shape to be easily inserted between the inner insulation layer 2a and the metal foil 3 of the cable 2.

A method for flaring the metal foil 3 into a cone shape (also referred to as a trumpet shape) by the flaring mouth 100 will be described in detail with reference to FIGS. 10-12.

Figure 10:
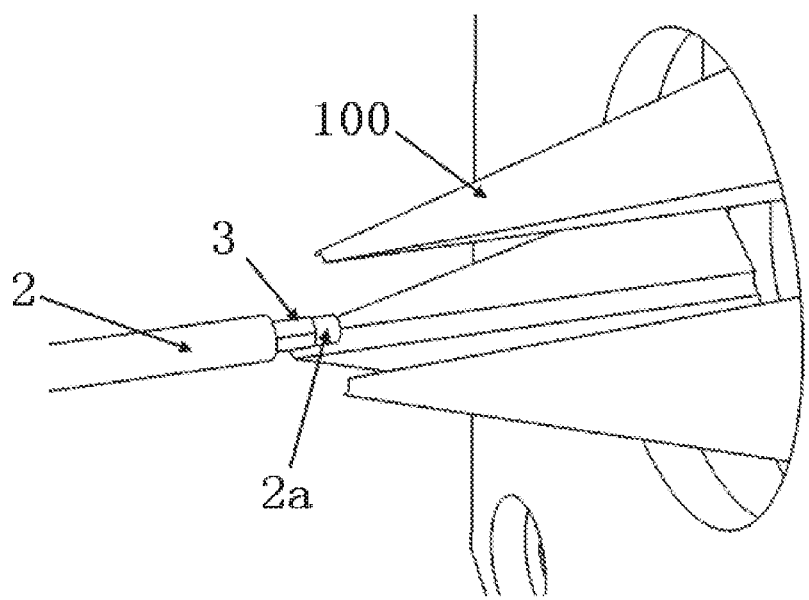
FIG. 10 is a perspective view of an end of a cable positioned in the flaring mouth with the flaring mouth in the open position.

First, as shown in FIG. 10, an exposed section of the inner insulation layer 2a of the cable 2 is placed in the open flaring mouth 100.

Figure 11:
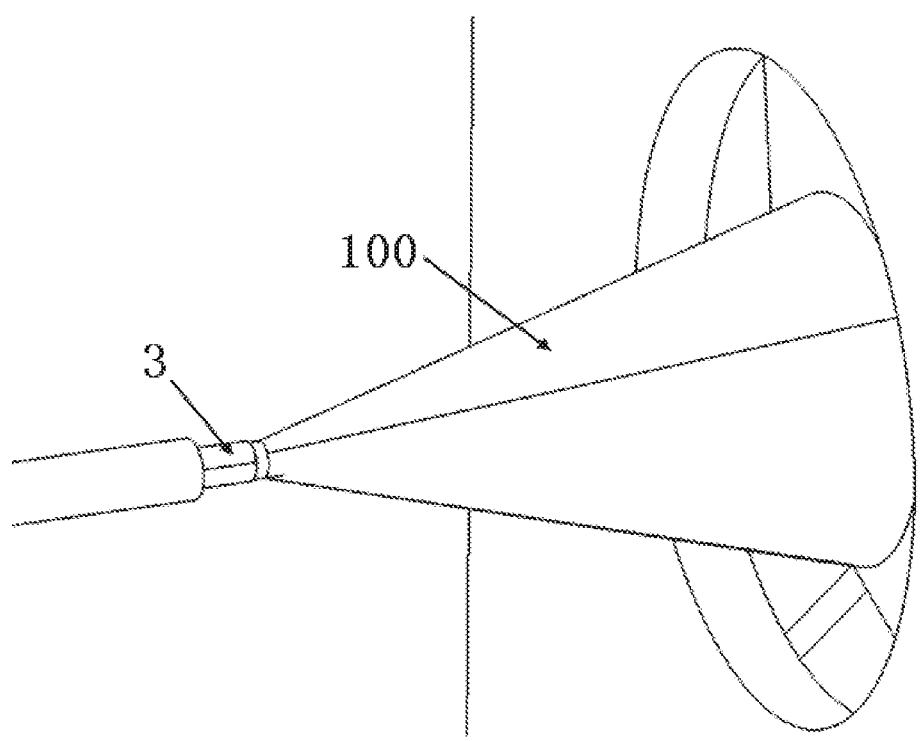
FIG. 11 is a perspective view of the end of the cable positioned in the flaring mouth with the flaring mouth in the closed position on the cable.

Then, as shown in FIG. 11, the flaring mouth 100 is closed so that the exposed section of the inner insulation layer 2a of the cable is held in the flaring mouth 100.

Thereafter, as shown in FIG. 11, the closed flaring mouth 100 is rotated to properly straighten the ends of the cable 2.

Figure 12:
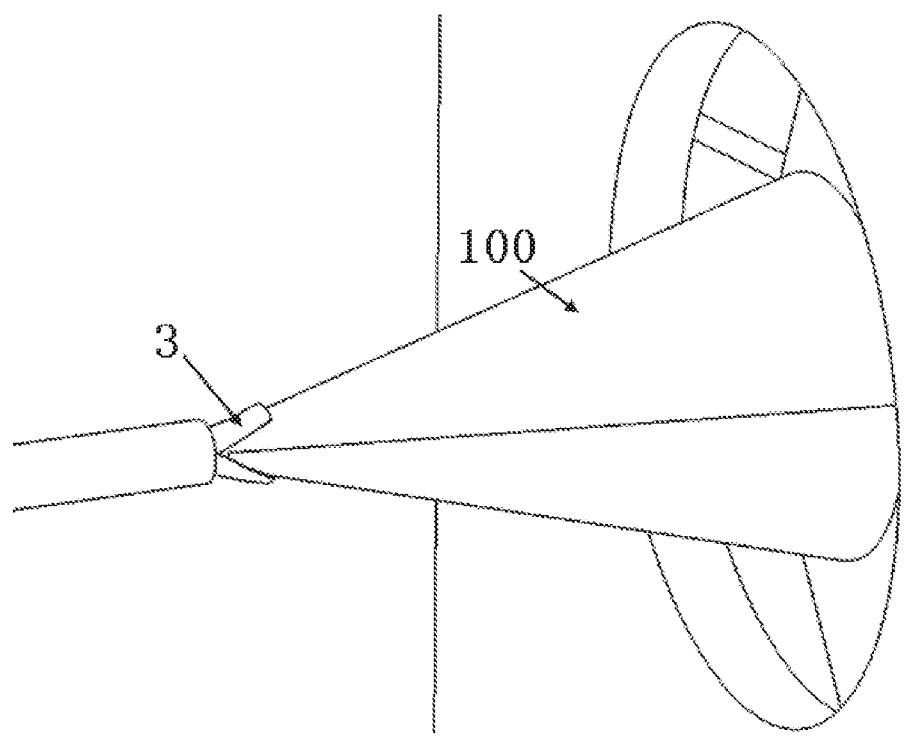
FIG. 12 is a perspective view of an operation of moving forward the flaring mouth to flare a metal foil wrapped around the end of the cable into a cone shape.

Finally, as shown in FIG. 12, the flaring mouth 100 is moved toward the cable 2 and inserted between the inner insulation layer 2a and the metal foil 3 of the cable 2 so as to flare the metal foil 3 outwardly into a cone shape. The metal foil flaring apparatus may thereby automatically flare the metal foil 3 into the cone shape, improving the flaring efficiency and the quality.

What is claimed is:

1. A metal foil flaring apparatus, comprising:
    a frame;
    a flaring mechanism mounted on the frame and having a flaring mouth adapted to open and close; and
    a first driver mounted on the frame and adapted to drive the flaring mouth to open and close, the flaring mouth has a cone shape gradually contracted toward a front end of the flaring mouth, the front end of the flaring mouth is adapted to be forwardly inserted in a first direction between an inner insulation layer of a cable and a metal foil wrapped around the inner insulation layer in a closed state of the flaring mouth to flare the metal foil outwardly into the cone shape, the flaring mouth is rotatable about an axis parallel to the first direction with the flaring mouth in the closed state, the first driver is adapted to drive the flaring mouth to rotate about the axis with the flaring mouth in the closed state.

2. The metal foil flaring apparatus of claim 1, further comprising a slide rail extending linearly in the first direction, the frame is slidably mounted on the slide rail, and a second driver adapted to drive the frame and the flaring mechanism mounted on the frame to move linearly in the first direction.

3. The metal foil flaring apparatus of claim 2, wherein the slide rail is mounted on a fixed base, the second driver has a motor and a transmission mounted on the fixed base.

4. The metal foil flaring apparatus of claim 2, wherein the flaring mechanism is drivable by the second driver to move linearly forward to insert the front end of the flaring mouth between the inner insulation layer and the metal foil with the flaring mouth in the closed state and the front end of the flaring mouth clamped on the inner insulation layer of the cable.

5. The metal foil flaring apparatus of claim 1, wherein the flaring mouth in the closed state defines a center retaining hole extending linearly in the first direction, the inner insulation layer of the cable is retained in the center retaining hole, the cable is straightened by rotating the flaring mouth with the inner insulation layer of the cable retained in the center retaining hole.

6. The metal foil flaring apparatus of claim 1, wherein the flaring mechanism includes:
- a rotary spindle rotatably mounted on the frame to be rotatable about the axis;
- a fixed plate fixed on the frame and having a plurality of guide grooves;
- a plurality of transmission mechanisms each having a main body with a first end pivotally connected onto the rotary spindle and a second end having a first sliding bar; and
- a rotation plate rotatably mounted on the fixed plate to be rotatable about the axis and having a plurality of radial sliding grooves perpendicular to the axis.

7. The metal foil flaring apparatus of claim 6, wherein the flaring mouth has a plurality of flaring mouth members, each of the flaring mouth members has a connection plate perpendicular to the axis, a pair of second sliding bars, and an insertion hole located between the second sliding bars.

8. The metal foil flaring apparatus of claim 7, wherein the first sliding bar on each of the transmission mechanisms is insertable into one of the guide grooves, one of the radial sliding grooves, and one of the insertion holes, the second sliding bars on each of the flaring mouth members are insertable into one of the radial sliding grooves.

9. The metal foil flaring apparatus of claim 8, wherein each of the guide grooves has an arc-shaped guide groove centered on the axis and a radial guide groove communicated with the arc-shaped guide groove and perpendicular to the axis.

10. The metal foil flaring apparatus of claim 9, wherein the first driver is adapted to drive the rotary spindle to rotate about the axis, the rotary spindle is adapted to drive the first sliding bars to slide in the guide grooves and the radial slide grooves.

11. The metal foil flaring apparatus of claim 10, wherein the first driver has a motor mounted on the frame, a pulley connected with the rotary spindle, and a drive belt connected between an output shaft of the motor and the pulley, the pulley is driven by the motor through the drive belt to rotate the rotary spindle.

12. The metal foil flaring apparatus of claim 10, wherein the flaring mouth members are driven to open or close with the first sliding bars on the transmission mechanisms slidable in the radial guide grooves of the guide grooves.

13. The metal foil flaring apparatus of claim 10, wherein the flaring mouth members and the rotation plate are driven to rotate about the axis with the first sliding bars of the transmission mechanisms slidable in the arc-shaped guide grooves of the guide grooves.

14. The metal foil flaring apparatus of claim 7, wherein each of the flaring mouth members has an arc-shaped retaining groove extending linearly in the first direction, the arc-shaped retaining grooves in the flaring mouth members define a center retaining hole with the flaring mouth members in the closed state.

15. The metal foil flaring apparatus of claim 6, wherein the main body of each of the transmission mechanisms has a pin at the first end, the rotary spindle has a flange with a connection hole matched with the pin, the pin is inserted into the connection hole and freely rotatable in the connection hole.

16. The metal foil flaring apparatus of claim 7, wherein the flaring mechanism has a housing mounted onto the fixed plate, the rotation plate and the connection plate of the flaring mouth members are accommodated in the housing.

17. The metal foil flaring apparatus of claim 16, wherein the housing has a circular opening through which the flaring mouth members of the flaring mouth protrude from the housing.

18. The metal foil flaring apparatus of claim 1, wherein the flaring mouth has a plurality of notches at the front end to facilitate an insertion of the front end of the flaring mouth between the inner insulation layer and the metal foil.

19. The metal foil flaring apparatus of claim 1, wherein the front end of the flaring mouth is formed as a wedged-shape.

* * * * *